United States Patent
Kirk et al.

(10) Patent No.: US 10,268,657 B2
(45) Date of Patent: Apr. 23, 2019

(54) CONFIGURATION OF CONTENT SITE USER INTERACTION MONITORING IN DATA NETWORKS

(71) Applicant: TEALIUM INC., San Diego, CA (US)

(72) Inventors: Dustin A. Kirk, San Diego, CA (US); Ike S. Lin, San Diego, CA (US)

(73) Assignee: TEALIUM INC., San Diego, CA (US)

( * ) Notice: Subject to any disclaimer, the term of this patent is extended or adjusted under 35 U.S.C. 154(b) by 0 days.

(21) Appl. No.: 16/000,459

(22) Filed: Jun. 5, 2018

(65) Prior Publication Data

US 2018/0349506 A1 Dec. 6, 2018

Related U.S. Application Data

(60) Provisional application No. 62/515,985, filed on Jun. 6, 2017.

(51) Int. Cl.
| | | |
|---|---|---|
| G06F 16/957 | (2019.01) | |
| G06F 3/0483 | (2013.01) | |
| G06F 17/27 | (2006.01) | |
| G06F 8/38 | (2018.01) | |
| G06F 3/0484 | (2013.01) | |
| G06F 17/21 | (2006.01) | |
| G06F 17/22 | (2006.01) | |

(52) U.S. Cl.
CPC ........ *G06F 16/9577* (2019.01); *G06F 3/0483* (2013.01); *G06F 3/04842* (2013.01); *G06F 8/38* (2013.01); *G06F 17/211* (2013.01); *G06F 17/227* (2013.01); *G06F 17/2705* (2013.01)

(58) Field of Classification Search
None
See application file for complete search history.

(56) References Cited

U.S. PATENT DOCUMENTS

| | | | |
|---|---|---|---|
| 7,562,070 B2 | 7/2009 | Tchaitchian et al. | |
| 8,533,761 B1 * | 9/2013 | Sahami | H04N 5/44543 725/51 |
| 8,805,946 B1 | 8/2014 | Glommen et al. | |
| 8,843,827 B2 | 9/2014 | Koo et al. | |
| 8,904,278 B1 | 12/2014 | Anderson et al. | |
| 8,990,298 B1 | 3/2015 | Anderson | |
| 9,081,789 B2 | 7/2015 | Anderson | |

(Continued)

OTHER PUBLICATIONS

Krasinnir Tsonev, CSS-Only Solution for UI Tracking, Oct. 16, 2014, Smashing Magazine, pp. 1-10 Retrieved: https://www.smashingmagazine.com/2014/10/css-only-solution-for-ui-tracking/ (Year: 2014).*

(Continued)

*Primary Examiner* — Howard Cortes
(74) *Attorney, Agent, or Firm* — Knobbe, Martens, Olson & Bear LLP

(57) ABSTRACT

Style instructions, which may be coded in a style language and not include application logic, can be used to both control presentation of content of a web page by a web browser and control monitoring of interactions with the web page. Selectors in the style instructions, for example, can be used to identify elements of the web page and define styles for the elements. As a result of implementing such style instructions, individuals tasked with design of a web page can more easily and quickly configure monitoring of interactions with the web page.

20 Claims, 9 Drawing Sheets

(56) References Cited

U.S. PATENT DOCUMENTS

| | | | |
|---|---|---|---|
| 9,116,608 B2 | 8/2015 | Koo et al. | |
| 9,313,287 B2 | 4/2016 | Glommen et al. | |
| 9,357,023 B2 | 5/2016 | Glommen et al. | |
| 9,363,311 B1 | 6/2016 | McWilliams et al. | |
| 9,479,609 B2 | 10/2016 | Anderson | |
| 9,537,964 B2 | 1/2017 | Glommen et al. | |
| 9,635,100 B2 | 4/2017 | McWilliams et al. | |
| 9,690,868 B2 | 6/2017 | Anderson | |
| 9,753,898 B1 | 9/2017 | Glommen et al. | |
| 9,769,252 B2 | 9/2017 | Glommen et al. | |
| 9,787,795 B2 | 10/2017 | Anderson | |
| 9,807,184 B1 | 10/2017 | Slovak et al. | |
| 2011/0238524 A1* | 9/2011 | Green | G06Q 30/0241 705/26.7 |
| 2013/0212161 A1* | 8/2013 | Ben-Shaul | G06F 9/4451 709/203 |
| 2015/0161084 A1* | 6/2015 | Long | G06F 17/30864 715/205 |
| 2015/0254349 A1* | 9/2015 | Sela | G09B 5/125 707/770 |
| 2015/0264423 A1* | 9/2015 | Torgemane | G06F 8/30 715/719 |
| 2016/0070813 A1* | 3/2016 | Unter Ecker | G06F 17/30896 715/234 |
| 2016/0255496 A1* | 9/2016 | Andersson | G06F 9/44505 715/745 |
| 2018/0136820 A1* | 5/2018 | Nagao | G06F 3/04842 |
| 2018/0137206 A1 | 5/2018 | Slovak | |

OTHER PUBLICATIONS

JavaScript, Wikipedia, https://en.wikipedia.org/wiki/JavaScript, accessed on Apr. 16, 2017, in 24 pages.

JSON, Wikipedia, https://en/wikipedia.org/wiki/JSON, accessed on Apr. 16, 2017, in 14 pages.

Scalable Vector Graphics, Wikipedia, https://en.wikipedia.org/wiki/Scalable_Vector_Graphics, accessed on Apr. 16, 2017, in 14 pages.

Style sheet language, Wikipedia, https://en.wikipedia.org/wiki/Style_sheet_language, accessed on Apr. 4, 2017, in 2 pages.

Cascading Style Sheets, Wikipedia, https://en.wikipedia.org/wiki/Cascading_Style_Sheets, accessed on Mar. 29, 2017, in 20 pages.

\* cited by examiner

FIG. 4A

```
1  <!DOCTYPE html>
2  <html>
3  <head>
4    <style>
5      input[type='text']{
6        tealium_track:input_field;
7      }
8      .button{
9        tealium_track:input_button;
10     }
11   </style>
12 </head>
13 <body>
14   
15   <input type="text" />
16   <div class="button">Submit</div>
17 </body>
18 <script>
19 var trackingStyles = document.getElementsByTagName("STYLE");
20 for (i = 0; i < trackingStyles.length; i++) {
21   var trackingStyle = trackingStyles[i].innerHTML;
22   var trackingElements = trackingStyle.split(';');
23   trackingElements.forEach(processAttributes);
24 }
25 function processAttributes(item, index){
26   var itemSelector = item.substring(0,item.indexOf('{')).replace(/ +?/g,'').replace(/(\r\n|\n|\r)/gm,"");
27 
```

```
29      var attributes = item.substring(item.indexOf('"')+1,item.length).split(',');
30      for(i=0; i < attributes.length-1; i++){
31          attribute = attributes[i];
32          var attributeName = attribute.substring(0,attribute.indexOf(':'));
33          var attributeValue = attribute.substring(attribute.indexOf(':'),attribute.length);
34          attributeName = attributeName.replace(':',"").replace(/ +?/g,"");
35          attributeValue = attributeValue.replace(':',"").replace(/ +?/g,"");
36          if(attributeName.indexOf('tealium_track') > 0){
37              addTrackingListener(itemSelector, attributeValue);
38          }
39      }
40  }
41
42  function addTrackingListener(elementSelector, attributeValue){
43      var JSselector = document.querySelector(elementSelector);
44      var selectorContent = JSselector.innerHTML;
45      JSselector.addEventListener("click", function(){
46          utag.link({
47              // key value pairs to send
48              event_name: attributeValue
49          });
50      });
51  }
52  </script>
53
54  </body>
55  </html>
```

```
1   <!DOCTYPE html>
2   <html>
3   <head>
4     <style>
5       [track]:active:after{
6         position: absolute;
7         z-index: -1;
8       }
9       [track=id_1]:active {content: url(t.tiqcdn.com/account1234/id_1)}
10      [track=id_2]:active {content: url(t.tiqcdn.com/account1234/id_2)}
11      [track=id_3]:active {content: url(t.tiqcdn.com/account1234/id_3)}
12      [track=id_4]:active {content: url(t.tiqcdn.com/account1234/id_4)}
13      [track=id_5]:active {content: url(t.tiqcdn.com/account1234/id_5)}
14    </style>
15  </head>
16  <body>
17    <div track="id_1">
18      <span track="id_2">item 2</span>
19      <a href="#page3" track="id_3">item 3</a>
20      <input type="text" track="id_4" />
21      <input type="button" value="submit" track="id_5">
22    </div>
23  </body>
24  </html>
```

FIG. 6

CONFIGURATION OF CONTENT SITE USER INTERACTION MONITORING IN DATA NETWORKS

RELATED APPLICATIONS

Any and all applications for which a domestic priority claim is identified in the Application Data Sheet of the present application are hereby incorporated by reference under 37 CFR 1.57.

BACKGROUND

Some operators of content sites, such as websites, regularly obtain the results of analytics performed with regard to user interactions on their content sites. User analytics can include any type of data regarding interactions of end users with content sites, among other types of data.

SUMMARY

An aspect of at least one of the inventions disclosed herein includes the realization that although web page instructions for monitoring user interactions are normally coded with web page application logic, such instructions can be coded as style instructions, and thus can be more easily useable and adjustable by web page designers for controlling the monitoring of the interaction of users with web page elements.

For example, style instructions, which may be coded in a style language and not include application logic, are normally used to control presentation of content of a web page by a web browser. Such style instructions are written in a format or coding language that is substantially different from that of application logic instructions and may be more widely understood than the application logic instructions (for example, because the style instructions may be written in a less sophisticated coding language than the application logic instructions). An aspect of at least one of the inventions disclosed herein includes the realization that interaction monitoring control instructions can also be coded in a style language, along with instructions that control the presentation of elements on a web page.

In some embodiments, selectors in the style instructions, for example, can be used to identify elements of the web page to be monitored and define styles for the elements as well. As a result of coding such monitoring instructions as part of the web page style instructions, individuals tasked with the design of a web page can easily and quickly configure monitoring of interactions with and appearance of elements of a web page. Moreover, in some instances, the individuals may have permissions to adjust web page style instructions but not have permissions to adjust other code like application logic instructions, so the individuals may desirably be able to themselves adjust the web page style instructions to configured the monitoring without the assistance of others like programmers.

In some embodiments, a system for processing and transmitting data indicative of user interactions with a web page is disclosed. The system can include a memory device and a hardware processor. The memory device can store a web page, style instructions, and script instructions. The style instructions can influence a visual presentation of content of the web page and identify a first element and a second element of the web page for which user interactions with the first element and the second element are to be monitored. The style instructions can be coded in a style language and may not include application logic. The hardware processor can be in communication with the memory device. The hardware processor can: receive the web page via a computer network, load the web page in a web browser, visually present the content in the web browser according to the style instructions, execute the script instructions, process the style instructions as part of executing the script instructions, determine to monitor the user interactions with the first element and the second element from processing the style instructions as part of executing the script instructions, monitor for the user interactions with the first element and the second element in the web browser, detect a first user interaction with the first element in the web browser and a second user interaction with the second element in the web browser, and transmit first data indicative of the first user interaction and second data indicative of the second user interaction to a computing system via the computer network.

The system of the preceding paragraph can include one or more of the following features: The style instructions can indicate a type of the user interactions with the first element and the second element that is to be monitored. The type of the user interactions can include a user selection by a user (i) pressing on a first input device or (ii) positioning an indicator through moving a second input device. A beginning of the style instructions can be identified by a start tag, or an end of the style instructions can be identified by an end tag. The style language is Cascading Style Sheets (CSS). The style instructions can influence the visual presentation of the first element and the second element in the web browser, and the hardware processor can visually present the first element and the second element in the web browser according to the style instructions. The style instructions can include a selector designating an identifier associated with the first element. The script instructions may not identify any elements of the web page for which the interactions with any elements of the web page are to be monitored. The web page can include the style instructions. The web page may not include the style instructions. The first element can be a link, an input field, a button, or a portion of the content. The hardware processor can execute the script instructions by interpreting the script instructions.

In some embodiments, a method for processing and transmitting data indicative of user interactions with a content page is disclosed. The method can include: under control of a hardware processor in communication with a memory device: loading a content page in a browser, the content page comprising content including text; visually presenting the content including the text in the browser according to first instructions, the first instructions include computer language for influencing a visual presentation of the content including the text and for identifying an element of the content for which user interactions with the element are to be monitored; processing the first instructions as part of executing second instructions; determining to monitor the user interactions with the element from processing the first instructions as part of executing the second instructions; monitoring for the user interactions with the element in the web browser; detecting a first user interaction with the element in the web browser; and transmitting data indicative of the first user interaction to a computing system via a computer network.

The method of the preceding paragraph can include one or more of the following features: The first instructions can be coded in a style language. The method can further include determining a beginning of the first instructions from a start code indicator or an end of the first instructions from an end code indicator. The detecting the first user interaction can include detecting a user selection of the element in the web browser. The element can be a link, an input field, or a web page portion.

In some embodiments, non-transitory physical computer storage including computer-executable instructions stored thereon that, when executed by one or more processors, are configured to implement a process for processing and transmitting data indicative of user interactions with a content page. The process can include: loading a content page in a browser, the content page including content; visually presenting the content in the browser according to first instructions comprising computer language for influencing a visual presentation of the content and for identifying an element of the content page for which interactions with the element are to be monitored; processing the first instructions as part of executing second instructions; determining to monitor the interactions with the element from processing the first instructions as part of executing the second instructions; monitoring for a user interaction with the element in the web browser; detecting the user interaction with the element in the web browser; and transmitting data indicative of the user interaction with the element via a computer network.

The non-transitory physical computer storage of the preceding paragraph can include one or more of the following features: The first instructions can be coded in a style language. A beginning of the first instructions can be identified by a start code indicator, or an end of the first instructions can be identified by an end code indicator.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIGS. 4A and 4B depicts example instructions for configuring monitoring of user interactions with a content page.

FIG. 6 depicts other example instructions for configuring monitoring of user interactions with a content page.

DETAILED DESCRIPTION

I. Introduction

Figure 1:
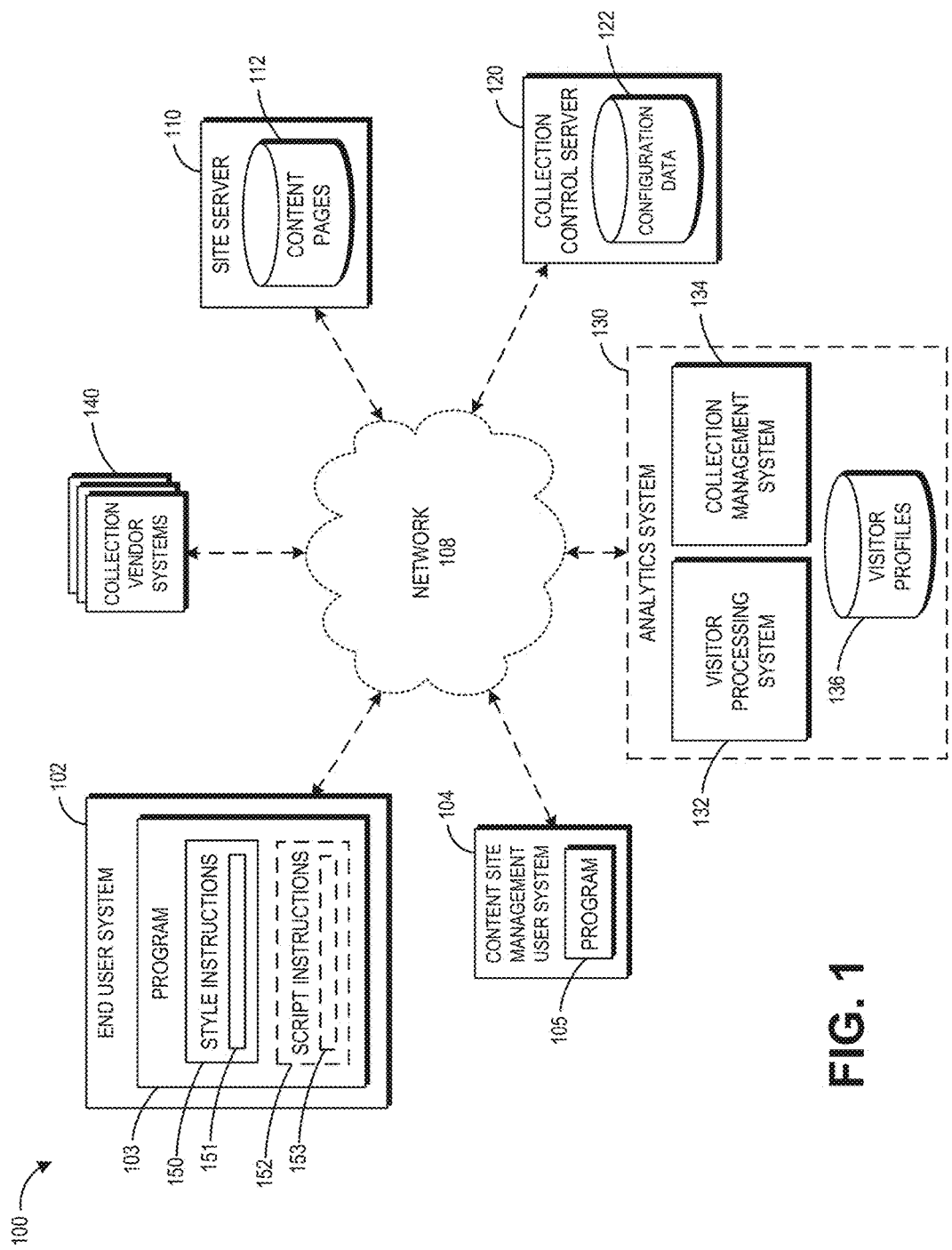
FIG. 1 depicts an example computing environment for managing the collection of user interaction data.

The design of a content site (for example, a website) has typically been managed by individuals different from individuals responsible for managing monitoring of user interactions with the content site. The individuals tasked with content site design are often responsible for determining how content of the content site is presented to end users of the content site. The design of the content site can be controlled, for instance, by adjusting style instructions that may be in a style language that indicates how structured documents are to be presented. The style information can correspond, for instance, to a presented font, color, opacity, visibility, shadow, blur, color shift, size, emphasis, borders, outlines, resolution, shape, fit, thickness, margins, padding, punctuation, capitalization, word wrap, animation, transition, user interface properties, speech properties, marquee properties, alignment, perspective, orientation, or arrangement of the content. On the other hand, the individuals tasked with configuring monitoring of user interactions are often responsible for determining which elements (for example, links, input fields, divs, spans, and list items) of the content site are to be monitored and how the elements are to be monitored. The monitoring of end user interactions can, for instance, be adjusted by changing configuration instructions that may be in a script language different from the style language.

Embodiments of the present disclosure can advantageously, in certain instances, enable the individuals tasked with design of a content site to more easily and quickly configure monitoring of user interactions with the content site. The style language can, for example, have built-in selectors that may be used to both identify elements of the content site and define styles for the elements. This may beneficially enable improved management of monitoring of user interactions because (i) such management may be performed by adjusting the style language and without adjusting a script language and (ii) such management can be readily performed alongside content site design. In one example, if the presentation of an element of a content page (for instance, a webpage) of the content site is changed by changing particular instructions, the same instructions may be changed at approximately the same time to also adjust the monitoring of user interactions with the element.

Moreover, embodiments of the present disclosure can desirably, in certain instances, improve the performance of an end user system that monitors user interactions with a content site. For example, the processing speed for the end user system can be increased and bandwidth utilization may be decreased through the placement, allocation, configuration, or processing of code as described herein, for instance, due to reduced or consolidated code. As another example, the end user system can monitor for and communicate data indicative of user interactions via a computer network under technical conditions that previously would have prevented or limited such monitoring or communication. As yet a further example, the management of monitoring user interactions can be simplified and consolidated such that similar or the same monitoring actions may be readily applied to multiple different elements of a content page or multiple different content pages of a content site.

II. Overview

A style language like Cascading Style Sheets (CSS) loaded in a browser (for example, a web browser) can be utilized to both identify elements on a content page of a content site for monitoring and make server calls that indicate actions (for example, clicking on one or more elements of the content page) made on the content page. Such style language can be used as part of at least two approaches for monitoring user interactions with the content site. In one approach, the style language may supplement script monitoring, such as JavaScript™ monitoring, by identifying one or more elements to be tracked. In another approach, the style language may be used without also utilizing script monitoring.

Selectors of a style language can enable the identification of one or more elements of a content page that are to be influenced by a rule. Selectors thus can be used to identify particular elements of content pages and particular actions to be monitored for the elements of the content page. Content site designers can flexibly determine how and where selectors are defined using the style language. The selectors can be specified in line with elements of the content page, within a block of definitions within the content page, or external to the content page (for example, in a separate style instructions file, which may or may not be hosted on a different domain from the content site allowing for separate management of the style language and content site). The selectors can, moreover, enable targeting of multiple elements that have a certain element type, class name, attribute value, or attribute, as well as targeting of elements based on screen size using media queries. The selectors can be defined through a user interface, and the style language can be automatically generated according to configuration selections received via the user interface.

The use of a style language as described herein can, in some embodiments, advantageously enable monitoring capabilities when certain functionality like scripts, such as JavaScript™, may be limited or disabled. For example, use of scripts may be limited or disabled for a variety of reasons, including enhancing speed, bandwidth, usability, accessibility, or security for content pages or end user systems. Scripts, in some instances, may load more slowly than other parts of a content page or consume extra bandwidth during download of a content page. Scripts also may not be available for some devices with less robust processing capabilities or can be used for delivery of malicious or undesired code.

In implementations where selectors of a style language may be used for identifying elements to be monitored, an attribute associated with monitoring can be placed in the stylesheet language. This attribute can be termed a monitoring marker. The selector can identify one or more elements of the content site desired to be tracked. The monitoring marker can have a value, which can be a monitoring identifier. The monitoring identifier can be used for monitoring purposes to distinguish between different elements on a content page. For example, when an element such as a button is selected by user, monitoring code associated with the button can instruct to send data, such as page name, form identifier, combinations of the same, or the like, back to a server. Upon loading of a content page in the browser, a script or other code can be executed by the browser to parse the style language, identify one or more elements to be parsed, and attach script calls to the identified elements during runtime. Styles of the style language can be applied as usual within a markup language like HyperText Markup Language (HTML).

In implementations where a style language may be used without utilizing script monitoring, monitoring can be performed using style language and markup language loaded in a browser together with server-side parsing. The script language and markup language may cause the browser to make requests to network resource identifiers (for example, Uniform Resource Locators (URLs)) from a server. The server can, in turn, parse the requested network resource identifiers to perform monitoring of user interactions.

In one example of the implementations of the preceding paragraph, the style language can include style definitions utilizing monitoring URLs that are called by the browser in response to certain content page interactions. This type of style definition can be referred to as a tracker, and the URL in the tracker can be composed of a domain name, an account identifier, and a monitoring identifier. By applying the style definition to an element of a content page, the URL can be called when a user performs an action specified by a selector of the tracker (for example, 'active'=a user clicks an element, or 'hover' when a user hovers a mouse over an element). Multiple trackers may be applied to one element of a content site, and multiple trackers can be triggered by nesting multiple elements that have trackers applied to the multiple elements. Trackers may be applied to an element by following associated style guidelines, including divisions, spans, list items, form fields, anchor links, or the like.

Continuing the example of the preceding paragraph, a server referenced by the URL can be configured to use a script to parse the URL into component pieces. This can involve identifying an account identifier and a monitoring identifier from the URL. Once parsed, a log can be kept that identifies which monitoring identifier was called, which account identifier made the call, and when the call was performed. From this log, a record can be generated of how many times a monitoring identifier was called by an account identifier during a given time frame. The server may additionally or alternatively obtain details from referral data, including a server and page making a request, an associated identifier address (for example, an Internet Protocol (IP) address), browser information, a user agent, or the like.

A style language has been traditionally used to control presentation of structured documents and facilitate separate management of document content and document presentation. The style language may, for instance, be used to create a desired look or feel for the document content by influencing a format of displayed text, visual effects and arrangements for displayed elements, and use of particular user interface features for a content page. An aspect of at least one of the inventions disclosed herein includes the realization that a style language can be used to identify or configure elements on a content site for monitoring.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

III. Monitoring Management Systems and Methods

FIG. 1 illustrates a computing environment 100 for implementing various content site management features, including some or all of the monitoring management features described herein. In the computing environment 100, an end user system 102 communicates over a network 108 with a site server 110. The end user system 102 can include any form of computing device and may be a desktop, laptop, smartphone, tablet, or the like. A program 103, such as a browser or other application software installed in the end user system 102, can access one or more content pages of a content site stored in a content pages storage 112 of the site server 110. The content pages can be files that may be accessed remotely and provided to the end user system 102. Accordingly, the content pages may be web pages, emails, documents, videos, images, text, combinations of the same, or the like. The content pages can include content, such as text, images, videos, sounds, or the like that may be presented to an end user by the end user system 102 via the program 103.

The program 103 can process style instructions 150 that may control presentation of the content pages by the program 103. In addition, the program 103 can process monitoring instructions 151 of the style instructions 150 which identify one or more elements of a content page to be monitored for user interactions, how to monitor one or more elements of the content page, or how to report about monitoring of one or more elements of the content page. The program 103 can further optionally execute script instructions 152 that may be used separately or in combination with the monitoring instructions 151 as described herein to identify one or more elements for monitoring, how to monitor, or how to report about monitoring. The script instructions 152 can, in some instances, include monitoring instructions 153, which may be usable independently of the style instructions 150 to initiate monitoring by the program 103. The script instructions 152 can be written in a different coding language than the style instructions 150.

The site server 110 may be a web server, an application server, a database server, combinations of the same, or the like. Further, the network 108 can include a local area network (LAN), a wide area network (WAN), a company intranet, the public Internet, combinations of the same, or the like.

One or more content pages stored in the content pages storage 112 can include or be configured to obtain monitoring code, such as the style instructions 150 or the script instructions 152, that enables a content site manager to measure traffic and visitor behavior with respect to the one or more content pages. Some examples of script instructions usable with or in combination with this disclosure include the tags, tag container, and universal tag described in U.S. Pat. No. 8,805,946, which is hereby incorporated by reference in its entirety. If the one or more content pages does not include the style instructions 150 or the script instructions 152 or if the site server 110 did not automatically provide the style instructions 150 or the script instructions 152, the style instructions 150 or the script instructions 152 may, for example, be automatically requested and obtained from the content pages storage 112 of the site server 110 or a configuration data storage 122 of a collection control server 120 upon execution of calling code in one or more content pages.

Figure 3:
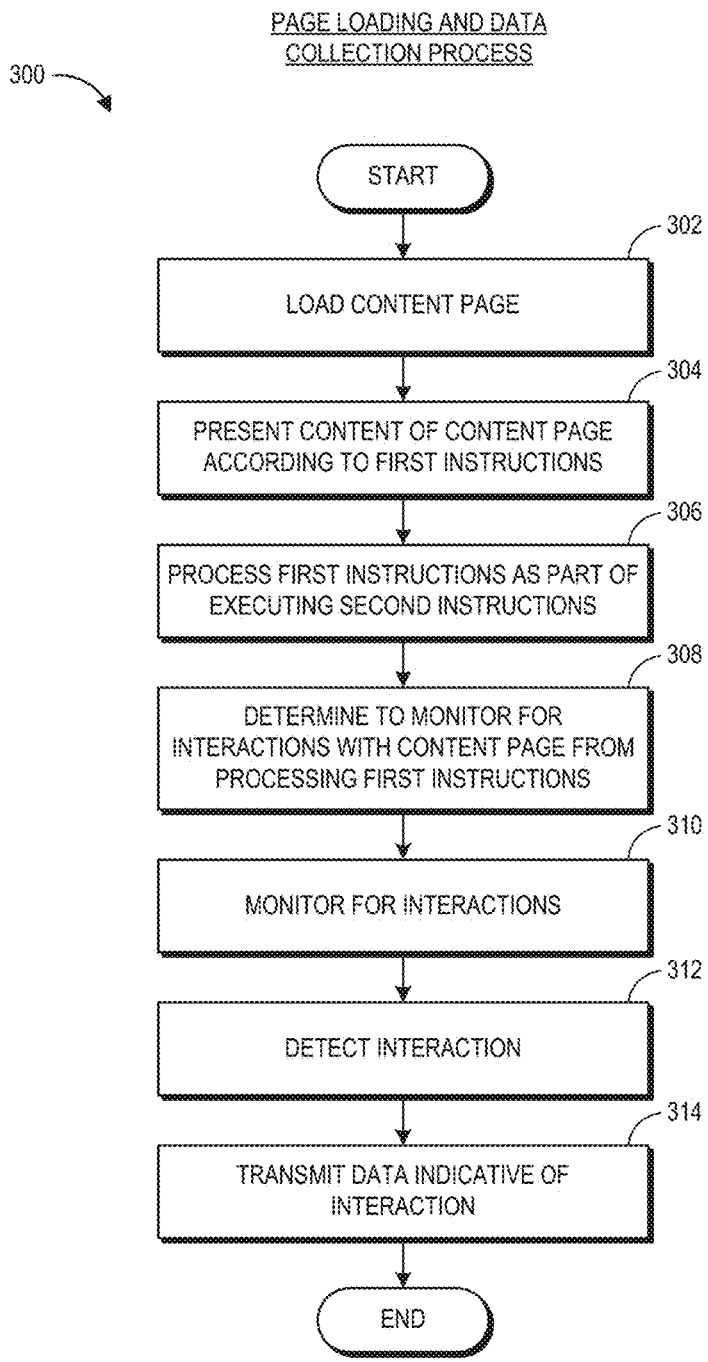
FIG. 3 depicts an example page loading and data collection process.
Figure 5:
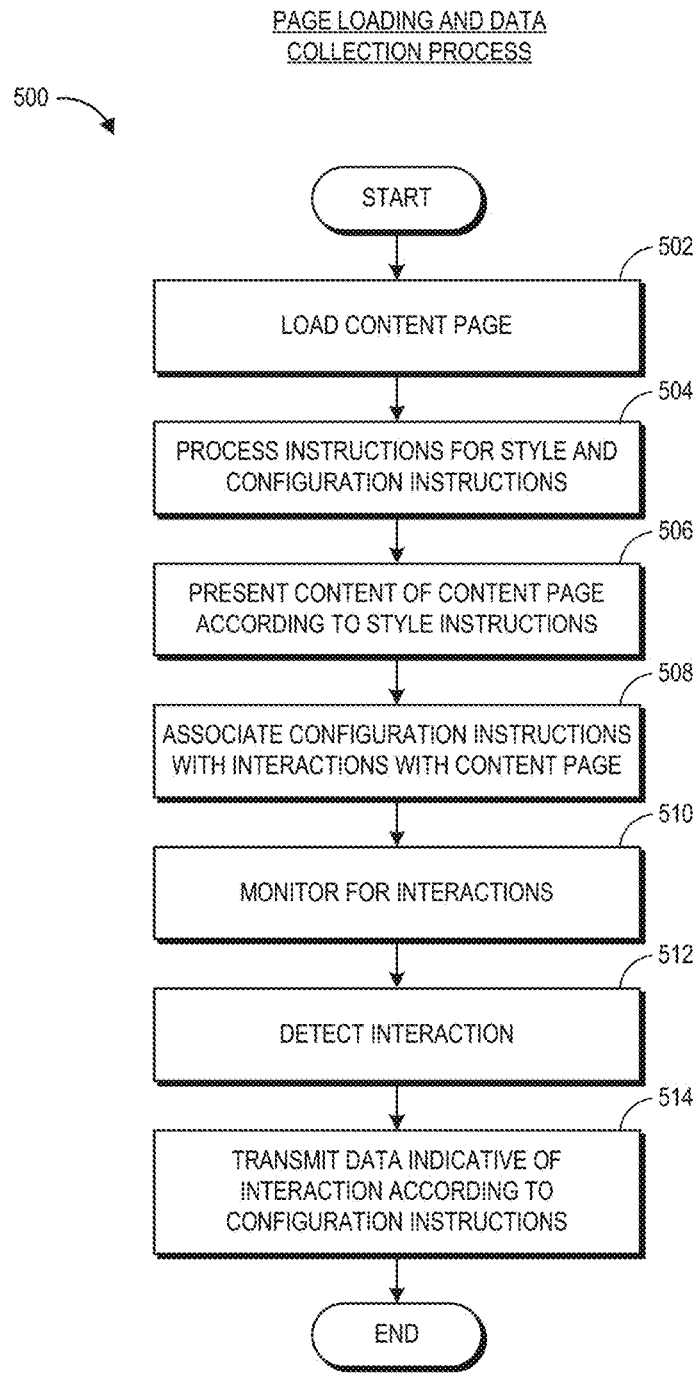
FIG. 5 depicts another example page loading and data collection process.

Upon execution of the style instructions 150 or the script instructions 152, such as in the program 103 and as described in greater detail with respect to FIGS. 3 and 5, visitor identification or other data reflecting user interactions with the one or more content pages can be gathered and supplied to an analytics system 130 or collection vendor systems 140 (optionally through the collection control server 120). The style instructions 150 or the script instructions 152 can be used to gather any type of visitor data for visitors to the content site. The collection control server 120 and the analytics system 130 can be implemented in computer hardware or software.

The analytics system 130 can include a visitor processing system 132 and a collection management system 134, as well as a visitor profiles storage 136. The visitor processing and collection management systems 132, 134 are shown separately for illustrative purposes, although their functionality may be implemented by a single system. The analytics system 130 can also be implemented without the collection management system 134, and thus, the functionality of the visitor processing system 132 can be implemented independent of any collection management functionality. Further, the analytics system 130 can be implemented without the visitor processing system 132, and thus, the functionality of the collection management system 134 can be implemented independent of any visitor processing functionality.

The visitor processing system 132 can enable content site management users to configure the types of data tracked for different visitors of a content site, as well as to analyze and report on this visitor data. For instance, the visitor processing system 132 can provide one or more user interfaces that enable customization of information monitored about visitors to a content site. This information can be obtained initially from executing the style instructions 150 or the script instructions 152, which may be provided through the site server 110 or the collection control server 120 to the end user system 102 for execution in the program 103. Visitor data can be supplied by the program 103 to the visitor processing system 132 (optionally through the collection control server 120) and stored in visitor profiles in the visitor profiles storage 136. Content site management users can, for example, subsequently query the visitor profiles to obtain reports or other information about content site visitors.

The collection management system 134 can be used to manage monitoring code, such as the style instructions 150 or the script instructions 152, associated with the content pages stored in the content pages storage 112. For instance, the collection management system 134 can provide functionality for content site management users to select which monitoring code to associate with one or more content pages for a variety of vendor-specific processing purposes or customize monitoring code for particular content pages. These purposes can include obtaining analytics for data analysis or business intelligence, tracking affiliate activity with respect to a content site, obtaining user data for displaying targeted ads, obtaining user data for customizing search functionality or email campaigns targeted to the end users, obtaining user data for personalizing content of a content page, obtaining user data for integration with social networking functionality, obtaining user data for big data analysis, combinations of the same, or the like. Data collected by executing monitoring code can be provided to the collection vendor systems 140, which can perform any of this vendor-specific processing. The data collected or related data may additionally or alternatively be passed to the collection vendor systems 140 through the site server 110, the collection control server 120, or the analytics system 130. In some embodiments, the collection management system 134 can include a publish engine that generates or revises monitoring code and provides the revised monitoring code to the site server 110 or the collection control server 120 for delivery to end user systems.

A content site management user system 104 can access the site server 110, the collection control server 120, or the analytics system 130 via the network 108. The content site management user system 104 can include a program 105, such as an application software or browser, which can access network applications over the network 108. The content site management user system 104 can also be any type of computing device including, but not limited to, a desktop, laptop, tablet, smartphone, or the like. The content site management user system 104 can be operated by content site management users such as marketing professionals, website operators, business users, operators of a content site or the site server 110, or any other individual who designs a content site or uses monitoring code or data obtained therefrom. Content site management users are not the end users of a content site in certain embodiments.

The content site management users can use the content site management user system 104 to perform various functions related to managing a content site. The content site management users can adjust content or revise the presentation of content for one or more pages of the content site via the program 105. Content can be added to or removed from the content pages stored in the content pages storage 112 using the program 105. The presentation of content can be revised via the program 105 by changing formatting data the style instructions 150 which is associated with the content. The style instructions 150 can be coded in a style language (sometimes referred to as a style sheet language). The content site management users can use the content site management user system 104 to communicate with the site server 110, the collection control server 120, or the analytics system 130 to update the types of data tracked or analyzed for different visitors of a content site or customize monitoring code, such as the style instructions 150 or the script instructions 152, for particular content pages.

The computing environment 100 can additionally include more end user systems and content site management user systems than just the end user system 102 and the content site management user system 104 shown in FIG. 1. Multiple end user systems can thus access content pages from the site server 110 via the network 108, and multiple content site management user systems can interact with the analytics system 130 via the network 108. Moreover, the content site 110 and the collection control server 120 can, in some instances, respectively incorporate one or more features of the content site and the tag server described in U.S. Pat. No. 8,805,946, which was previously incorporated by reference herein in its entirety.

Figure 2A:
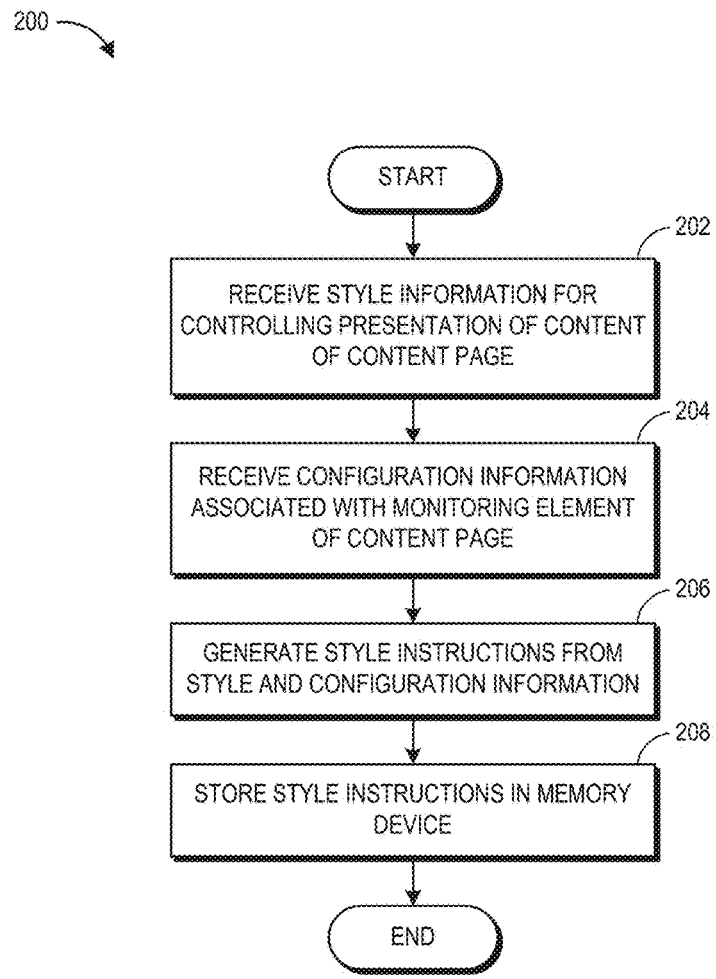
FIGS. 2A and 2B depict example instructions generation processes.

Turning to FIG. 2A, an instructions generation process 200 is shown. The process 200 illustrates an example mode of operation of the computing environment 100 and may be implemented by the various components shown in the computing environment 100. For convenience, the process 200 is described in the context of the computing environment 100, but may instead be implemented by other systems described herein or other computing systems not shown. The process 200 provides one example approach by which style instructions, such as the style instructions 150 of FIG. 1, can be prepared for later transmission to and processing by the program 103. Advantageously, in certain embodiments, the process 200 can provide style instructions that consolidate instructions for both controlling presentation of content of a content page and enabling monitoring of user interactions with one or more elements of the content page. The process 200 can be performed, for example, by the content site management user system 104, the site server 110, or the analytics system 130.

At block 202, the process 200 can receive style information for controlling presentation of content of a content page. The style information can be received as a user input, setting, or other accessed indication of how the content should be visually or audibly presented to a user of the end user system 102. The style information can correspond, for instance, to changes of font, color, opacity, visibility, shadow, blur, color shift, size, emphasis, borders, outlines, resolution, shape, fit, thickness, margins, padding, punctuation, capitalization, word wrapping, animation, transition, user interface properties, speech properties, marquee properties, alignment, perspective, orientation, or arrangement of the content. The style information can be received in the form of computer language from a developer or identifications of portions of the content and corresponding styles to associate with the portions, among other ways. In some implementations, the content site management user system 104, the site server 110, or the analytics system 130 can receive the style information via or from the program 105, the content pages storage 112, or the visitor profiles storage 136.

At block 204, the process 200 can receive configuration information associated with monitoring of one or more elements of the content page. The configuration information can be received as a user input, setting, or other accessed indication of the one or more elements, a way in which the one or more elements should be monitored as the user of the end user system 102 interacts with the one or more elements, or how to notify in response to interactions. The configuration information can, for instance, be received in the form of computer language from the developer and include one or more of an identification of the one or more elements, monitoring to perform for the one or more elements, or an indication of how to report the monitoring. In some implementations, the one or more elements can each be a link, an input field, or a portion of the content of the content page, among other possibilities. The interaction with the element can include a user interaction with the element, such as a user selection of the element. In some implementations, the content site management user system 104, the site server 110, or the analytics system 130 can receive the configuration information via or from the program 105, the content pages storage 112, or the visitor profiles storage 136.

At block 206, the process 200 can generate style instructions from the style information and the configuration information. The style instructions can, for instance, be generated for placement within a common area of a single data file. The style instructions can include computer language both for influencing presentation of the content in the program 103 and for enabling monitoring of interactions with the one or more elements of the content page via the program 103. A beginning of the style instructions can, in some instances, be identified in a data file by a start tag (for example, such as an HTML tag like <style>), and an end of the style instructions can be identified in the data file by an end tag (for example, such as an HTML tag like </style>). The style instructions may be in a style language like CSS, which may, for example, be used to style content in a markup language like HTML. The style instructions in some cases may not include application logic or executable commands. The style language may not, in some embodiments, be an object-oriented programming language (for example, a programming paradigm based on the concept of "objects", which may contain (i) data, in the form of fields, sometimes referred to as attributes and (ii) code, in the form of procedures, sometimes referred to as methods; where, for instance, a feature of objects is that an object's procedures can access or modify the fields of the object with which they are associated so that objects may have a notion of "this" or "self", and objects can interact with one another). In some implementations, the content site management user system 104, the site server 110, or the analytics system 130 can generate the style instructions.

At block 208, the process 200 can store the style instructions to a memory device. The style instructions can, for example, be stored by the content site management user system 104, the site server 110, or the analytics system 130 to the content pages storage 112 or the configuration data storage 122. The style instructions may be stored in association with the content page for delivery to the end user system 102 via the network 108. Moreover, because the style instructions may be applied to multiple different content pages and thus may be considered not to be page-specific, the style instructions may be stored in association with one or more other content pages as well.

Figure 2B:
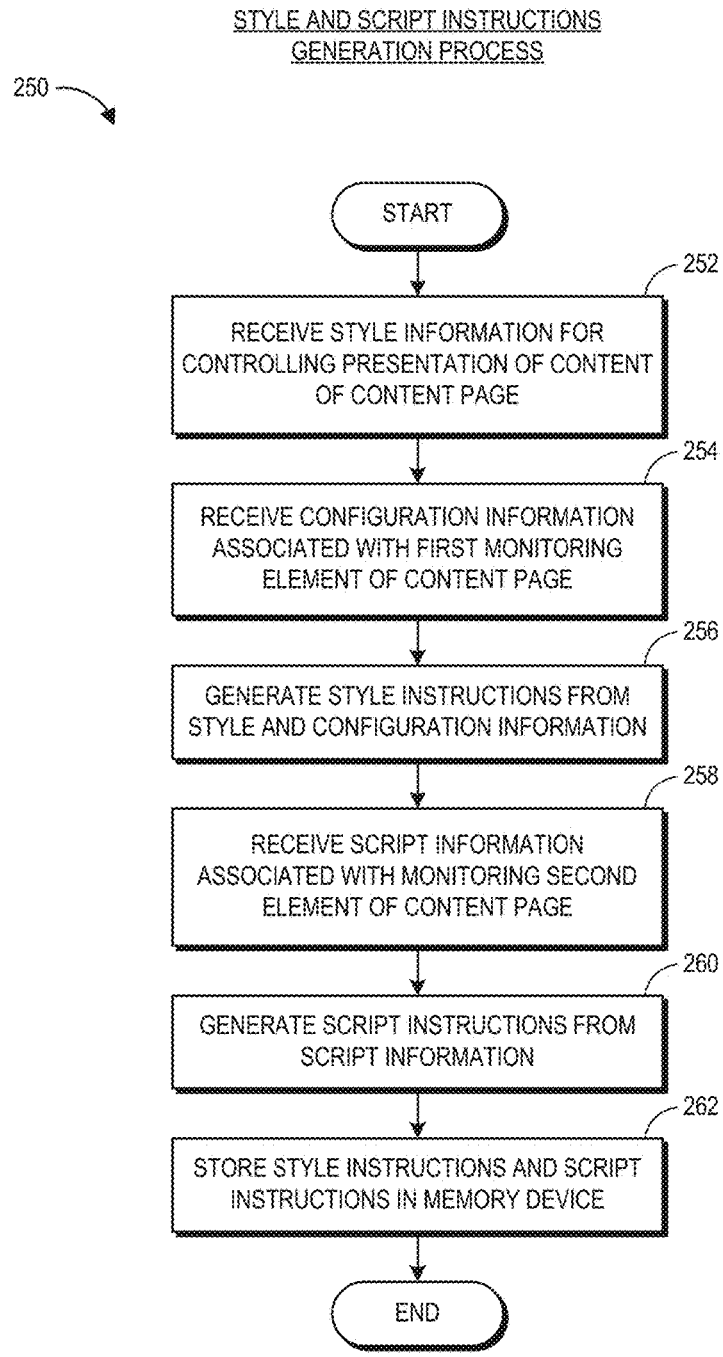

FIG. 2B illustrates an instructions generation process 250. The process 250 illustrates another example mode of operation of the computing environment 100 and may be implemented by the various components shown in the computing environment 100. For convenience, the process 250 is described in the context of the computing environment 100, but may instead be implemented by other systems described herein or other computing systems not shown. The process 250 can be at least in part similar to the process 200. The process 250 can differ from the process 200 notably in that the process 250 further facilitates generation of script instructions usable separately from style instructions, such as the script instructions 152 of FIG. 1, to initiate monitoring of user interactions with a content site. The process 200 can be performed, for example, by the content site management user system 104, the site server 110, or the analytics system 130.

Blocks 252, 254, 256 can respectively be similar to or the same as blocks 202, 204, 206 of FIG. 2A.

At block 258, the process 250 can receive script information associated with monitoring of one or more second elements of the content page. The one or more second elements can be the same as or at least partly different from one or more first elements of the content page associated with the configuration information at block 254. The script information can be received as a user input, setting, or other accessed indication of the one or more second elements, a way in which the one or more second elements should be monitored as the user of the end user system 102 interacts with the one or more second elements, or how to notify in response to interactions. The script information can be received via the same or a different user interface from the user interface used to receive the style or configuration information at blocks 252 and 254, and the script information can be received from the same or a different device at the same or different time as the device or time the style or configuration information is received at blocks 252 and 254. In some implementations, the one or more second elements can each be a link, an input field, or a portion of the content of the content page, among other possibilities. The interaction can include a user interaction such as a user selection. In some implementations, the content site management user system 104, the site server 110, or the analytics system 130 can receive the script information via or from the program 105, the content pages storage 112, or the visitor profiles storage 136.

At block 260, the process 250 can generate script instructions, such as the script instructions 152 of FIG. 1, from the script information. The script instructions may be in a script language like JavaScript™ and enable monitoring of interactions with the one or more elements of the content page via the program 103. The script language may, in some embodiments, be an object-oriented programming language, such as a prototype-based language (for instance, where behavior reuse may be performed via a process of reusing existing objects via delegation that serve as prototypes). The script instructions can include application logic or executable commands. A beginning of the instructions can, in some instances, be identified in a data file by a start tag (for example, such as an HTML tag like <script>), and an end of the instructions can be identified in the data file by an end tag (for example, such as an HTML tag like </script>). In some implementations, the content site management user system 104, the site server 110, or the analytics system 130 can generate the instructions.

At block 262, the process 250 can store the style instructions generated at block 256 and the script instructions generated at block 260 to a memory device. The style and script instructions can, for example, be together or separately stored by the content site management user system 104, the site server 110, or the analytics system 130 to the content pages storage 112 or the configuration data storage 122. The script and style instructions may be stored in association with the content page for delivery to the end user system 102 via the network 108.

FIG. 3 illustrates a page loading and monitoring configuration process 300. The process 300 illustrates an example mode of operation of the computing environment 100 and may be implemented by the various components shown in the computing environment 100. For convenience, the process 300 is described in the context of the computing environment 100, but may instead be implemented by other systems described herein or other computing systems not shown. The process 300 provides one example approach by which the program 103 can be instructed to monitor for user interactions with a content page and accordingly monitor for and transmit data indicative of user interactions with the content page. Advantageously, in certain embodiments, the process 300 can enable placement of instructions, such as the style instructions 150 of FIG. 1, for controlling presentation of content of the content page together with instructions for monitoring of interactions of one or more elements of the content page. The process 300 can be performed, in some implementations, by the end user system 102, such as the program 103.

At block 302, the process 300 can load a content page. The content page can, for instance, be loaded in the program 103 and include content like text, images, videos, or sounds presentable to a user.

At block 304, the process 300 can present the content of the content page according to first instructions. The content can be presented by the program 103 as a result of loading the content page at block 302. The first instructions can provide one or more indications to the program 103 of how to present the content, such as a font, color, opacity, visibility, shadow, blur, color shift, size, emphasis, borders, outlines, resolution, shape, fit, thickness, margins, padding, punctuation, capitalization, word wrapping, animation, transition, user interface properties, speech properties, marquee properties, alignment, perspective, orientation, or arrangement for one or more portions of the content. For example, the first instructions may indicate to display certain text of the content in one color and other text of the content in a different color on a display or to display particular text of the content with one size and other text with a different size on the display.

An example portion of the first instructions is shown in style area 410 of end user instructions 400 of FIGS. 4A and 4B. The example portion is coded in CSS and includes example instructions for identifying one or more elements of the content page to be monitored for interactions, a way in which to monitor for the interactions, and how to report about the monitoring, but does not include example instructions for influencing presentation of the content in the program 103. Example instructions for influencing presentation of the content in CSS may, for instance, include "body {background-color: powderblue;}" which can color a background of a body portion of the content page as powder blue, "h1 {color: blue;}" which can color a header 1 portion of the content of the content page as blue, or "p {color: red;}" which can color a paragraph portion of the content of the content page as red. An example of markup language, which may be associated with the example portion, is shown in markup area 420 of the end user instructions 400.

The content page may or may not include the first instructions. In cases where the content page does not include the first instructions, the content page may, for example, include call instructions to cause the program 103 to obtain the first instructions, such as by requesting and then receiving the first instructions via the network 108 from the collection control server 120 which may store the first instructions in the configuration data storage 122. The first instructions can, in some cases, be the same as or similar to the style instructions 150 of FIG. 1 or the style instructions generated and stored at blocks 206 and 208 of FIG. 2A.

At block 306, the process 300 can process the first instructions as part of executing second instructions. The second instructions can be executed as a result of loading the content page in the program 103 at block 302. The second instructions may indicate to process the first instructions, which can include selectors, to configure monitoring and transmitting of data indicative of interactions with the content page. The selectors can declare which portion of the content page a style applies to by matching tags and attributes in the content page. The second instructions can be script instructions configured to be interpreted by the program 103 and may or may not be included as part of the content page. The second instructions may not, in some implementations, identify one or more elements of the content page for which interactions with the elements are to be monitored without referencing the first instructions. In other implementations, the second instructions may identify one or more elements of the content page for which interactions with the elements are to be monitored without referencing the first instructions, and the second instructions may also identify one or more additional or the same elements of the content page to be monitored.

An example of the second instructions is shown in script area 430 of the end user instructions 400. A beginning of the script area 430 can be identified in a data file by a start tag (for example, such as an HTML tag like <script>), and an end of the script area 430 can be identified in the data file by an end tag (for example, such as an HTML tag like </script>). A first portion 432 of the script area 430 illustrates example instructions to identify the first instructions for parsing. A second portion 434 of the script area 430 illustrates example instructions for parsing the first instructions to search for monitoring markers, which can identify one or more elements of the content page to monitor or how the one or more elements are to be monitored and the monitoring is to be reported. A first portion 412 of the style area 410 provides example instructions for a monitoring marker. A second portion 414 of the style area 410 provides example instructions for a monitoring identifier, which may be used to distinguish between multiple elements on a content page to be monitored.

At block 308, the process 300 can determine to monitor for interactions with the content page from processing the first instructions as part of executing the second instructions. For example, the program 103 can determine to monitor for user interactions, such as a user selection like clicking or hovering, with one or more elements of the content page from parsing the monitoring markers included in the first instructions. The one or more elements can, in some cases, include a link, an input field, a part of the content page, or the like.

At block 310, the process 300 can monitor for the interactions according to the determination at block 308. For instance, the program 103 can begin monitoring for the user interactions with the one or more elements of the content page as determined at block 308 by attaching script monitoring to the one or more elements. Example instructions for initiating monitoring by the program 103 for one or more elements marked with the monitoring marker are illustrated in a third portion 436 of the script area 430.

At block 312, the process 300 can detect an interaction from monitoring for the interactions at block 310. For example, the program 103 can detect a user selection of one element of the content page, which the program 103 monitored for the user interactions at block 310.

At block 314, the process 300 can transmit data indicative of the interaction detected at block 312. The data indicative of the interaction can include information about the occurrence of the interaction (for instance, a time, triggering input, or other characteristics of the interaction), information related to the interaction (for instance, events that occurred before the interaction or after the interaction or one or more user inputs potentially relevant to the interaction), or other information relevant to the recipient of the data. In one example, the data indicative of the interaction can be transmitted via the network 108 by the end user system 102 to the analytics system 130 or the collection vendor systems 140 in response to detection of the interaction at block 312.

FIG. 5 illustrates a page loading and monitoring configuration process 500. The process 500 illustrates an example mode of operation of the computing environment 100 and may be implemented by the various components shown in the computing environment 100. For convenience, the process 500 is described in the context of the computing environment 100, but may instead be implemented by other systems described herein or other computing systems not shown. The process 500 provides an example approach by which the program 103 can be used to monitor for interactions with a content page and transmit data indicative of user interactions with the content page. Advantageously, in certain embodiments, the process 500 can facilitate placement of instructions, such as the style instructions 150 of FIG. 1, for controlling presentation of content of the content page together with instructions for enabling monitoring of interactions with one or more elements of the content page. The process 500 can be performed, in some implementations, by the end user system 102, such as the program 103.

At block 502, the process 500 can load a content page. The content page can, for instance, be loaded in the program 103 and include content like text, images, videos, or sounds presentable to a user.

At block 504, the process 500 can process instructions for style and configuration instructions. The style and configuration instructions may be extracted or determined from the instructions. In one example, the configuration instructions can include one or more monitoring addresses (for instance, URLs or the like that may identify a location of a device on a computer network, as well as potentially a mechanism for retrieval).

The content page may or may not include the instructions. In cases where the content page does not include the instructions, the content page may include call instructions to cause the program 103 to obtain the instructions, such as by requesting and then receiving the instructions via the network 108 from the collection control server 120 which may store the instructions in the configuration data storage 122. The instructions can, in some cases, be the same as or similar to the instructions generated and stored at blocks 206 and 208 of FIG. 2A.

An example portion of the instructions is shown in style area 610 of end user instructions 600 of FIG. 6. The example portion is coded in CSS and includes example instructions for enabling monitoring of interactions with one or more elements of the content page, but does not include example instructions for influencing presentation of the content in the program 103. The example portion, moreover, illustrates how monitoring information including monitoring addresses may be assigned to monitoring identifiers. For example, the monitoring information of url(t.tiqcdn.com/account1234/id_5) can be assigned to the monitoring identifier id_5 as illustrated by the end user instructions 600.

A first portion 612 of the style area 610 illustrates example instructions to identify a domain name. A second portion 614 of the style area 610 illustrates example instructions to identify an account name. A third portion 616 of the style area 610 illustrates example instructions to identify a monitoring identifier. An example of markup language, which may be associated with the example portion of the instructions shown in style area 610, is provided in markup area 620 of the end user instructions 600. A portion 622 of the markup area 620 illustrates example instructions to identify a monitoring identifier, which can correspond to the monitoring identifier identified in the style area 610.

At block 506, the process 500 can present the content of the content page according to the instructions. The content can be presented by the program 103 as a result of loading the content page at block 502. The instructions can provide one or more indications to the program 103 as to how to present the content, such as a font, color, opacity, visibility, shadow, blur, color shift, size, emphasis, borders, outlines, resolution, shape, fit, thickness, margins, padding, punctuation, capitalization, word wrapping, animation, transition, user interface properties, speech properties, marquee properties, alignment, perspective, orientation, or arrangement for each portion of the content. For example, the instructions may indicate to display certain text of the content in one color and other text of the content in a different color on a display or to display particular text of the content with one size and other text with a different size on the display.

At block 508, the process 500 can associate the configuration instructions with interactions with the content page. The program 103 can, for instance, associate one or more monitoring addresses from the configuration instructions with user interactions with one or more elements of the content page. For example, the identifier id_5 can be associated with a button labeled submit, as provided in the end user instructions 600.

At block 510, the process 500 can monitor for the interactions. For instance, the program 103 can monitor for user interactions with one or more elements of the content page, including the one or more elements associated with the one or more monitoring addresses from the configuration instructions at block 508.

At block 512, the process 500 can detect an interaction from monitoring for the interactions at block 510. For example, the program 103 can detect a user selection of one element of the content page, such as the button labeled submit that may be generated from the end user instructions 600.

At block 514, the process 500 can transmit data indicative of the interaction detected at block 512. The data indicative of the interaction can, for instance, be a request by the program 103 to a monitoring address included in the configuration instructions. For example, the request can be made to the monitoring address like ttiqcdn.com/account1234/id_5 that is transmitted via the network 108 by the end user system 102 to the analytics system 130 or the collection vendor systems 140 in response to detection of the interaction at block 312.

Although not part of the process 500, upon receipt of the request, the analytics system 130 or the collection vendor systems 140 can parse the URL into component pieces, such as an account identifier and a monitoring identifier. Once parsed, a log can be kept identifying which monitoring identifier was called, which account identifier made the call, and when call was performed. From this log, a record can be generated of how many times a monitoring identifier was called by an account identifier during a given time frame. The server may also obtain further details from referral data, including a specific server and page making a request, an associated identifier address (for example, an Internet Protocol (IP) address), browser information, or a user agent.

Figure 7:
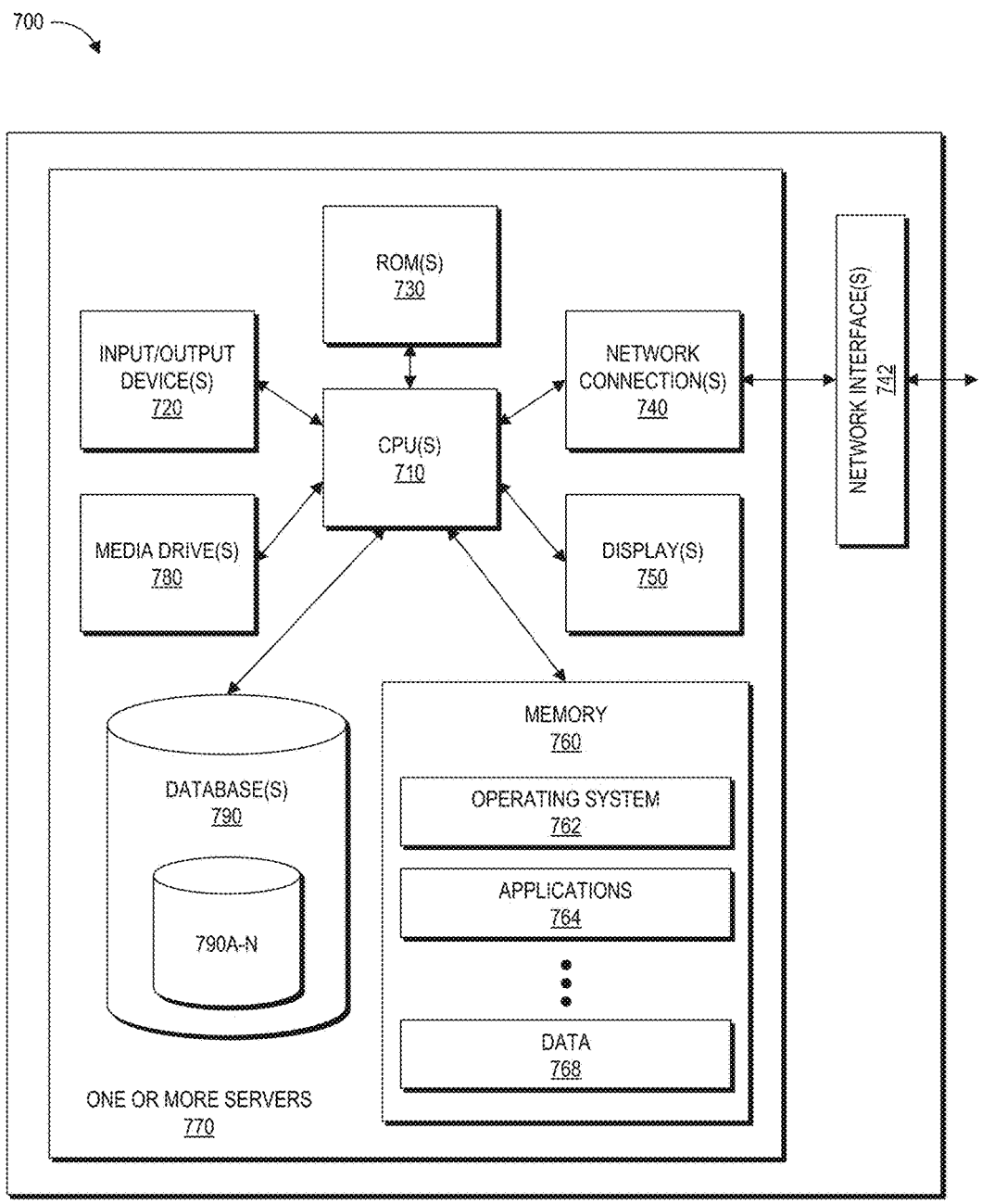
FIG. 7 depicts example system components usable to construct one or more of the systems or servers within the computing environment of FIG. 1.

FIG. 7 illustrates a computer system 700 usable to construct one or more of the systems (for instance, the end user system 102, content site management user system 104, or analytics system 130) or servers (for instance, the site server 110 or collection control server 120) within the computing environment 100 of FIG. 1.

As shown in FIG. 7, the system 700 can include (i) one or more processors (CPUs) 710, (ii) an input/output device(s) 720 configured to allow users to input and output information and interact with the system 700 as well as transfer and receive data, (iii) one or more read only memory (ROMs) devices 730 or equivalents to provide nonvolatile storage of data or programs, (iv) one or more displays 750 such as a computer monitor or other display device, (v) one more network connections 740 and associated network interfaces 742 configured to allow the system 700 to connect to other systems, servers or portable devices, as well as one or more memory spaces 760 and one or more databases 790. Database(s) 790 may be further divided or distributed as one or more sub-databases 790a-790n, with the sub-databases storing feature or function specific information associated with a particular feature or function. The various components shown in FIG. 7 may be incorporated in one or more physical servers 770. It is noted that the various components shown in FIG. 7, including database 790, are typically included as part of server(s) 770, however, they may be external to server(s) 770 in some embodiments. For example, database(s) 790 may be external to server(s) 770 and may be part of a separate database server system or networked database system. In some instances, the system may not be a server but rather a computing device like a desktop computer or mobile device.

One or more memory spaces 760 may comprise DRAM, SRAM, FLASH, hard disk drives or other memory storage devices, such as media drives 780, configured to store operating systems 762, application programs or data 764, and one or more memory spaces 760 may be shared with, distributed with or overlap with the memory storage capacity of database 790. In some embodiments, one or more memory spaces 760 may include database 790 or in some embodiments database 790 may include data 768 as shown in memory space 760. Data stored in memory space 760 or database 790 may include information, such as tracking management system information or other types of data described herein.

IV. Additional Embodiments and Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines or computing systems that can function together.

The pseudo classes like ":before" and ":after" can be applied when allowed, such as in HTML, to avoid conflicts when processing instructions for both controlling presentation of content of a content page and enabling monitoring of interactions of one or more elements of the content page. Moreover, one selector may be used rather than another selector when the another selector is in use. For example, CSS selector background-url( ) may be used when content: url( ) may already be in use or only when content:url( ) may already be in use.

As used herein, the terms "application" or "program," in addition to having their ordinary meanings, can refer to an executable code that when executed by a hardware processor causes the hardware processor to perform operations in accordance with the executable code. In some instances, an application or a program, moreover, may refer to executable code that was previously compiled. As used herein, the term "script," in addition to having its ordinary meaning, can refer to an executable script that when executed causes a hardware processor to perform operations in accordance with the executable script. In some instances, a script may refer to executable script that is interpreted and was not previously compiled.

In some embodiments, one or more parts of or all of the analytics system 130 or collection control sever 120 can be implemented in a distributed cloud platform that provides redundant or geographically dispersed access (for example, using a Multi-Content Delivery Network). Although not illustrated herein, one such example implementation is described and illustrated with respect to FIG. 25 of U.S. Pat. No. 8,805,946, titled "SYSTEM AND METHOD FOR COMBINING CONTENT SITE VISITOR PROFILES," which was previously incorporated by reference herein in its entirety.

Although the network 108 is shown as one connected network, the network 108 can be subdivided into one or more separate networks which may not directly communicate with one another. For example, the analytics system 130 can communicate with the site server 110 via a separate and different network from the network that the site server 110 uses to communicate with the end user system 102.

One or more user inputs described in this disclosure may be received using one or more different mechanisms. For example, user interface controls may be selected by a user using one or more input options, such as a mouse, touch screen input, or keyboard input, among other user interface input options. The user interface controls selected by the user can include one or more of buttons, dropdown boxes, select boxes, text boxes, check boxes, slider controls, or other user interface controls.

The monitoring features described herein can be used in combination with one or more other monitoring features not described in detail herein. For example, the monitoring features can be used in combination with a tracking pixel, which may also be used to provide data about an end user system that visits one or more content pages of a content site.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, a microprocessor, a state machine, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed:

1. A system for processing and transmitting data indicative of user interactions with a web page, the system comprising:
   a memory device configured to store a web page, style instructions, and script instructions, the style instructions being configured to influence a visual presentation of content of the web page, the style instructions comprising a monitoring marker and a plurality of monitoring identifiers to identify a first element and a second element of the content for which user interactions are to be monitored, the style instructions being coded in a style language and not comprising application logic, the script instructions indicating to process the style instructions; and
   a hardware processor in communication with the memory device, the hardware processor being configured to:
      receive the web page via a computer network,
      load the web page in a web browser,
      visually present the first element and the second element in the web browser according to the style instructions,
      execute the script instructions,
      as part of executing the script instructions,
         parse the style instructions to locate the monitoring marker and the plurality of monitoring identifiers in the style instructions,
         determine to monitor the user interactions with the first element and the second element from the monitoring marker and the plurality of monitoring identifiers, and
         attach script calls, according to the monitoring marker and the plurality of monitoring identifiers, to the first element and the second element to initiate monitoring for the user interactions with the first element and the second element in the web browser,
      detect, with the script calls, a first user interaction with the first element in the web browser and a second user interaction with the second element in the web browser,
      gather first data indicative of the first user interaction and second data indicative of the second user interaction, and
      transmit the first data and the second data to a computing system via the computer network.

2. The system of claim 1, wherein the hardware processor is configured to visually present the first element in the web browser as a color or a size according to the style instructions.

3. The system of claim 1, wherein the first user interaction comprises a user selection of the first element in the web browser.

4. The system of claim 1, wherein a beginning of the style instructions is identified by a start tag, and an end of the style instructions is identified by an end tag.

5. The system of claim 1, wherein the style language is Cascading Style Sheets (CSS).

6. The system of claim 1, wherein the hardware processor is configured to determine to gather the first data and the second data from the style instructions.

7. The system of claim 1, wherein at least some of the first data is gathered by the hardware processor prior to detection of the first user interaction.

8. The system of claim 1, wherein the script instructions do not identify any elements of the web page for which the interactions with any elements of the web page are to be monitored.

9. The system of claim 1, wherein the web page comprises the style instructions.

10. The system of claim 1, wherein the web page does not comprise the style instructions.

11. The system of claim 1, wherein the first element comprises a link, an input field, a button, or a portion of the content.

12. The system of claim 1, wherein the hardware processor is configured to execute the script instructions by interpreting the script instructions.

13. A method for processing and transmitting data indicative of user interactions with a content page, the method comprising:
   under control of a hardware processor in communication with a memory device:
      receiving a web page via a computer network, the web page comprising content including a first element and a second element;
      loading the web page in a web browser;
      visually presenting the first element and the second element in the web browser according to style instructions, the style instructions being configured to influence a visual presentation of the content, the style instructions comprising a monitoring marker and a plurality of monitoring identifiers to identify the first element and the second element for which user interactions are to be monitored, the style instructions being coded in a style language and not comprising application logic;
      executing script instructions that indicate to process the style instructions;
      as part of executing the script instructions,
         parsing the style instructions to locate the monitoring marker and the plurality of monitoring identifiers in the style instructions,
         determining to monitor the user interactions with the first element and the second element from the monitoring marker and the plurality of monitoring identifiers, and
         attaching script calls, according to the monitoring marker and the plurality of monitoring identifiers, to the first element and the second element to initiate monitoring for the user interactions with the first element and the second element in the web browser;
      detecting, with the script calls, a first user interaction with the first element in the web browser and a second user interaction with the second element in the web browser;
      gathering first data indicative of the first user interaction and second data indicative of the second user interaction; and transmitting the first data and the second data to a computing system via the computer network.

14. The method of claim 13, wherein a first monitoring identifier of the plurality of monitoring identifiers identifies the first element and not the second element, and a second monitoring identifier of the plurality of monitoring identifiers identifies the second element and not the first element.

15. The method of claim 13, further comprising:
under control of the hardware processor:
determining to gather the first data and the second data from the style instructions.

16. The method of claim 13, wherein the first user interaction comprises a user selection of the first element in the web browser.

17. The method of claim 13, wherein the web page comprises the script instructions.

18. Non-transitory physical computer storage comprising computer-executable instructions stored thereon that, when executed by one or more processors, are configured to implement a process for processing and transmitting data indicative of user interactions with a content page, the process comprising:
receiving a web page via a computer network, the web page comprising content including a first element and a second element;
loading the web page in a web browser;
visually presenting the first element and the second element in the web browser according to style instructions, the style instructions being configured to influence a visual presentation of the content, the style instructions comprising a monitoring marker and a plurality of monitoring identifiers to identify the first element and the second element for which user interactions are to be monitored, the style instructions being coded in a style language and not comprising application logic;
executing script instructions that indicate to process the style instructions;
as part of executing the script instructions,
parsing the style instructions to locate the monitoring marker and the plurality of monitoring identifiers in the style instructions,
determining to monitor the user interactions with the first element and the second element from the monitoring marker and the plurality of monitoring identifiers, and
attaching script calls, according to the monitoring marker and the plurality of monitoring identifiers, to the first element and the second element to initiate monitoring for the user interactions with the first element and the second element in the web browser;
detecting, with the script calls, a first user interaction with the first element in the web browser and a second user interaction with the second element in the web browser;
gathering first data indicative of the first user interaction and second data indicative of the second user interaction; and
transmitting the first data and the second data to a computing system via the computer network.

19. The non-transitory physical computer storage of claim 18, wherein a first monitoring identifier of the plurality of monitoring identifiers identifies the first element and not the second element, and a second monitoring identifier of the plurality of monitoring identifiers identifies the second element and not the first element.

20. The non-transitory physical computer storage of claim 18, wherein the process comprises determining to gather the first data and the second data from the style instructions.

* * * * *